United States Patent Office

2,977,516
Patented Mar. 28, 1961

2,977,516

LIQUID DIELECTRIC COMPOSITION AND USE THEREOF IN AN ELECTRICAL CAPACITOR

Harold I. Weingarten, Dayton, Ohio, assignor to Monsanto Chemical Company, St. Louis, Mo., a corporation of Delaware No Drawing. Filed Sept. 8, 1958, Ser. No. 759,407

14 Claims. (Cl. 317—258)

This invention relates to novel liquid dielectric compositions. More specifically this invention relates to novel mixtures of polyhalogenated biphenyls, which preferably contain about equimolecular quantities of biphenyls having the 2,3,2'- and 3,4,2'-positions occupied by halogen atoms, and to the method of preparing same.

Halogenated organic compounds in general and various chlorinated biphenyls and mixtures thereof have been widely employed in the production of dielectric and heat-exchanging media. These prior art chlorinated biphenyls are generally prepared by the direct chlorination of biphenyl in the presence of an iron catalyst to provide compositions preferably containing from about 40 to about 55 percent chlorine, as for example U.S. Patent No. 1,892,397. However, the various prior art chlorinated biphenyl compositions have heretofore appeared to be limited to dielectric constants at 1000 cycles and 25° C. of below about 6. Thus, for example, the prior art chlorinated biphenyls containing about 42% chlorine, about 48% chlorine and about 54% chlorine, respectively corresponding to about 3, about 4 and about 5 atoms of chlorine per biphenyl molecule, are reported to have dielectric constants at 1000 cycles and 25° C. of 5.8, 5.6 and 5.0.

It is the principal object of the present invention to provide novel compositions of polyhalogenated biphenyls having a dielectric constant at 1000 cycles and 25° C. substantially greater than the apparent prior art maximum of about 6. Another object of this invention is to provide a process for the preparation of novel dielectric compositions wherein the desired mixed isomers are present in substantially equivalent amounts. A further object of this invention relates to the preparation of insulating elements for use in various electrical apparatus, whereby the novel liquid dielectric composition is impregnated in paper, fabric, and other porous materials. Other objects of this invention will be apparent to those skilled in the art from the following disclosure.

It has now been found that substantially equimolecular mixtures of biphenyls having the 2,3,2'- and 3,4,2'-positions occupied by halogen atoms have unexpectedly high dielectric constants. Illustrative chlorinated biphenyl mixtures are for example 2,3,2'-trichlorobiphenyl with 3,4,2'-trichlorobiphenyl and 2,3,2',3'-tetrachlorobiphenyl with 3,4,2',3'-tetrachlorobiphenyl. Similar mixtures can be prepared wherein the chloro groups can be substituted in whole or in part by the other members of the halogen group having an atomic number up to 53, i.e. fluorine, bromine, and iodine, for example, mixtures of 2,3-dichloro-2'-bromobiphenyl with 3,4-dichloro-2'-bromobiphenyl, 2,3-dichloro-2,3'-difluorobiphenyl with 3,4-dichloro-2',3'-difluorobiphenyl, 2,3-diiodo-2'-chlorobiphenyl with 3,4-diiodo-2'-chlorobiphenyl, 3-bromo-2,2'-dichlorobiphenyl with 4-bromo-3,2'-dichlorobiphenyl, and the like. The chloro compounds are the preferred embodiment of the instant invention and will be employed hereinafter to more fully illustrate this invention, but it will be understood that the aforesaid other halogen atoms can be substituted in the illustrative processes and compositions.

One method by which the novel dielectric compositions of the instant invention can be prepared is by the homolytic reaction of a chlorophenyl radical from the group consisting of o-chlorophenyl and 2,3-dichlorophenyl radicals with o-dichlorobenzene. The chlorophenyl radicals can be produced, as for example by the Gomberg reaction, by diazotizing a chloroaniline in an aqueous solution at a temperature preferably at from about 0 to about 5° C. and effecting decomposition of the diazonium salt by neutralizing with an alkaline material to provide a pH preferably slightly greater than about 7, i.e., from about 7 to about 9. Suitable alkaline materials are sodium hydroxide, potassium hydroxide, sodium carbonate, trisodium phosphate, sodium acetate, and the like. The preparation of the chlorophenyl radicals are effected in the presence of the o-dichlorobenzene and the homolytic reaction is accelerated by warming the reaction mixture to room temperature, or higher, while agitating the system and allowing the reaction to continue at the particular selected temperature until the evolution of nitrogen has substantially ceased. The organic phase is then separated from the aqueous phase, washed with water, dried, filtered, the excess o-dichlorobenzene recovered by distillation, and the specific polychlorinated biphenyl mixtures obtained by fractional distillation. It will be understood that other methods for the preparation of the chlorophenyl radicals can be employed.

The specific polyhalogenated biphenyl mixtures of this invention are particularly useful in the production of dielectric and heat-exchanging media in view of their high dielectric constants, excellent thermal stability, resistance to oxidation, non-flammability, etc. Thus, the novel compositions can be employed as electrical insulating and cooling media for transformers, cables, switches and other electrical apparatus, and as coating and impregnating compositions for paper, fabric, and other porous materials which can be employed in the production of capacitors, as wrapping for electrical cables, etc., e.g., electrical condensers can be produced by interleaving a plurality of porous sheets, such as linen or kraft paper, with a plurality of sheets of metal foil, such as aluminum or tin, and rolling the said interleaved sheets to effect the formation of the condenser. The rolled condenser can then be impregnated with the novel compositions of this invention by any suitable means, such as vacuum impregnation and the like.

The novel mixed compositions of this invention also can be employed to upgrade the dielectric properties of the various prior art chlorinated biphenyl compositions and can also be formulated with other halogenated organic compounds as desired. Preferably the new compositions consist of at least about 30 weight percent of halogenated biphenyls of the instant invention, wherein the 2,3,2'- and/or 3,4,2'-positions are occupied by halogen atoms, and up to 70 weight percent of a prior art dielectric halogenated aromatic composition, wherein the new compositions are characterized by a dielectric constant at 1000 cycles and 25° C. of above about 7. Also small amounts of stabilizers, generally of the order of from about 0.05 to about 1%, based on the weight of the mixed halogenated organic composition, can be incorporated with the aforesaid compositions to act as scavengers for any hydrogen halide which may be present in the composition. Illustrative suitable stabilizers are dibutyl diphenyl tin, tetraphenyl tin, diphenyl tin diethylate, aluminum isopropylate, zinc dithiocarbamate and substituted derivatives thereof, aminated-N-phosphoryl-o-aminobiphenyl, o- and p-anisidine, p-nitroaniline, 2,4-diamininodiphenylamine, various organic antimony compounds, etc.

The following examples are illustrative of the instant invention:

Example 1

One hundred grams of anhydrous sodium acetate powder was added to about 400 mls. of o-dichlorobenzene in a closed reaction vessel provided with a stirrer, an inlet and a vapor exhaust line, and the mixture was cooled below 5° C. Then 28 grams of liquid nitrogen tetroxide was added thereto dropwise. Then 31 grams of o-chloroacetanilide in o-dichlorobenzene (about 400 mls.) solution was added dropwise to the mixture, during which time the temperature was held below 5° C. The temperature of the reaction mixture was allowed to rise to room temperature and stirring continued for one hour. The reaction mixture was then poured into ice water, washed with a 10 percent sodium acetate solution, dried over anhydrous magnesium sulfate, and filtered. The filtrate was returned to the reaction vessel and stirred at room temperature, then the temperature was slowly raised to about 90° C. to evolve an additional liter of nitrogen over the 2.3 liters evolved at room temperature. The reaction mixture was then passed through an alumina column and distilled to obtain a 24-gram cut of a trichlorobiphenyl mixture which had a boiling point of about 175° to about 180° C. at 6 mm. of mercury. The mixture was resolved by the vapor phase chromatographic method and found to consist of a substantially 1:1 mixture of 2,3,2'-trichlorobiphenyl (53±2%) and 3,4,2'-trichlorobiphenyl (47±2%). The aforesaid pale yellow liquid mixture was found to have a dielectric constant at 1000 cycles and 25° C. of 10.5 (ASTM D-150-47T).

Example 2

Into a similar reaction vessel to that employed in Example 1, were introduced 33 grams of 2,3-dichloroaniline and 60 ml. of concentrated hydrochloric acid, and the mixture cooled in an ice bath. Then a solution of 20 grams of sodium nitrite in 30 mls. of water was added slowly thereto during which time the temperature of the mixture was held below 5° C. This solution of diazonium salt was then added to 700 ml. of cold (about 5° C.) o-dichlorobenzene with vigorous stirring and the reaction mass neutralized with an aqueous solution of 100 grams of sodium acetate trihydrate. Then the ice bath was removed from the reaction vessel and the reaction mixture stirred at room temperature until the evolution of nitrogen subsided. Thereafter the temperature of the mixture was gradually raised to about 90° C. until no more nitrogen was evolved. Then the reaction mixture was washed several times with water, dried over anhydrous magnesium sulfate, and filtered. The filtrate was fractionally distilled, the excess o-dichlorobenzene recovered, and 25 grams of a product obtained which had a boiling point of 170 to 180° C. at 3 mm. of mercury. The product was identified as a substantially 1:1 mixture of 2,3,2',3'-tetrachlorobiphenyl and 3,4,2',3'-tetrachlorobiphenyl. This mixture from the Gomberg reaction was found to have a dielectric constant at 1000 cycles and 25° C. of 11.5.

Example 3

The prior art chlorinated biphenyl composition containing about 42% chlorine, corresponding to about 3 atoms of chlorine per biphenyl molecule, and having a dielectric constant of 5.8 was substantially upgraded by the addition thereto of a 30% by weight portion of the trichlorobiphenyl mixture of Example 1. The upgraded mixture was found to have a dielectric constant at 1000 cycles and 25° C. of 7.2, a power factor at 100 cycles and 25° C. of 0.06%, and a resistivity of 25° C. and 500 volts D.C. of $1.4 \times 10^{13}$ ohm-cm.

The specific high dielectric constant halogenated biphenyl mixtures of this invention also can be employed to upgrade other prior art chlorinated biphenyl and halogenated organic compound compositions to provide numerous novel compositions having improved properties for use in the production of dielectric and heat-exchanging media.

I claim:

1. A dielectric composition consisting essentially of a mixture of halogenated biphenyls wherein the 2,3,2'- and 3,4,2'-positions are occupied by halogen atoms having an atomic number up to 53.

2. A dielectric composition consisting essentially of a mixture of chlorinated biphenyls wherein the 2,3,2'- and 3,4,2'-positions are occupied by chlorine atoms.

3. The dielectric composition of claim 2, wherein the mixture of chlorinated biphenyls is 2,3,2'-trichlorobiphenyl and 3,4,2'-trichlorobiphenyl.

4. The dielectric composition of claim 2, wherein the mixture of chlorinated biphenyls is 2,3,2',3'-tetrachlorobiphenyl and 3,4,2',3'-tetrachlorobiphenyl.

5. The dielectric composition of claim 3, wherein the mixed trichlorobiphenyls are present in substantially equimolecular quantities.

6. The dielectric composition of claim 4, wherein the mixed tetrachlorobiphenyls are present in substantially equimolecular quantities.

7. A dielectric composition consisting essentially of a mixture of at least 30 weight percent of a compound selected from the group consisting of 2,3,2'-halogenated biphenyls, 3,4,2'-halogenated biphenyls, and mixtures thereof, wherein the halogen atoms have an atomic number up to 53, and up to 70 weight percent of a dielectric halogenated aromatic compound and the said composition is characterized by a dielectric constant at 1000 cycles and 25° C. of above 7.

8. The dielectric composition of claim 7, wherein the halogen atoms are chlorine.

9. A dielectric composition consisting essentially of a mixture of at least 30 weight percent of a compound selected from the group consisting of 2,3,2'-trichlorobiphenyl, 3,4,2'-trichlorobiphenyl, 2,3,2',3'-tetrachlorobiphenyl, 3,4,2',3'-tetrachlorobiphenyl, and mixtures thereof, and up to 70 weight percent of a dielectric polychlorobiphenyl composition, and the new composition is characterized by a dielectric constant at 1000 cycles and 25° C. of above 7.

10. An electrical capacitor comprising metal foil electrodes separated by a porous dielectric substance impregnated with a mixture of chlorinated biphenyls wherein the 2,3,2'- and 3,4,2'-positions are occupied by chlorine atoms.

11. The electrical capacitor of claim 10, wherein the mixture of chlorinated biphenyls is 2,3,2'-trichlorobiphenyl and 3,4,2'-trichlorobiphenyl.

12. The electrical capacitor of claim 10, wherein the mixture of chlorinated biphenyls is 2,3,2',3'-tetrachlorobiphenyl and 3,4,2',3'-tetrachlorobiphenyl.

13. The electrical capacitor of claim 11, wherein the mixed trichlorobiphenyls are present in substantially equimolecular quantities.

14. The electrical capacitor of claim 12, wherein the mixed tetrachlorobiphenyls are present in substantially equimolecular quantities.

References Cited in the file of this patent

UNITED STATES PATENTS

| | | |
|---|---|---|
| 1,836,180 | McCullough et al. | Dec. 15, 1931 |
| 2,070,268 | Glass | Feb. 9, 1937 |

OTHER REFERENCES

Wheland-Advanced Organic Chemistry, 2nd ed., 1954, John Wiley and Sons, Inc., N.Y., pp. 669–671.